US008144812B2

(12) United States Patent
Krishnaswamy

(10) Patent No.: US 8,144,812 B2
(45) Date of Patent: Mar. 27, 2012

(54) BEST FRAME DERIVATION IN A WIRELESS COMMUNICATIONS NETWORK

(75) Inventor: Dilip Krishnaswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 774 days.

(21) Appl. No.: 12/028,514

(22) Filed: Feb. 8, 2008

(65) Prior Publication Data

US 2009/0201977 A1 Aug. 13, 2009

(51) Int. Cl.
*H03K 9/00* (2006.01)

(52) U.S. Cl. ...... 375/316; 340/7.44; 341/94; 348/425.2; 369/53.35; 375/240.27; 708/530; 714/48; 714/758

(58) Field of Classification Search ............ None
See application file for complete search history.

(56) References Cited

U.S. PATENT DOCUMENTS

| 6,671,849 | B2 | 12/2003 | Tripathi et al. |
| 6,778,558 | B2 | 8/2004 | Balachandran et al. |
| 2003/0048800 | A1 | 3/2003 | Kilfoyle et al. |
| 2004/0179469 | A1 | 9/2004 | Attar et al. |
| 2005/0201329 | A1* | 9/2005 | Daley et al. ............ 370/331 |

OTHER PUBLICATIONS

Brennan, D.G., (1959) Linear diversity combining techniques. Proceedings of the IRE, vol. 47, pp. 1075-1102.
Burton, H.O., et al., (1972) Errors and error control. Proceeding of the IRE, vol. 60, No. 11, pp. 1293-1303.
Chase, David, (1985) Code combining—a maximum-likelihood decoding approach for combining an arbitrary number of noisy packets. IEEE Transactions on Communications, vol. COM-33, No. 5, pp. 385-393.
Krishnaswamy, Dilip, et al., (2006) Multi-level weighted combining of retransmitted vectors in wireless communications. IEEE Vehicular Technology Conference, Sep. 2006.
Ling, Fuyun, et al., (2000) Behavior and performance of power controlled IS-95 reverse-link under soft handoff. IEEE Transactions on Vehicular Technology, vol. 49, No. 5, pp. 1697-1704.
Acampora A S et al: "System Applications for wireless indoor communications" IEEE Communications Magazine, IEEE Service Center, Piscataway, US, vol. 25, No. 8. Aug. 1, 1987, pp. 11-20, XP000949107.
International Search Report and Written Opinion—PCT/US2009/032805, International Search Authority—European Patent Office—Aug. 17, 2009.

* cited by examiner

*Primary Examiner* — David C. Payne
*Assistant Examiner* — Adolf Dsouza
(74) *Attorney, Agent, or Firm* — Jeffrey D. Jacobs; Donald C. Kordich

(57) ABSTRACT

A communications node can receive a plurality of communication signals, each including a block of data estimates with respective quality metrics. Each block of data estimates can be derived from an original block of data sent over different wireless paths, or from a derived block of data estimates sent over a different wireless path. A data combining circuit can be used to combines the blocks of data estimates as a function of the respective quality metrics to produce an output set of data estimates with a derived quality metric.

27 Claims, 4 Drawing Sheets

BEST FRAME DERIVATION IN A WIRELESS COMMUNICATIONS NETWORK

FIELD OF THE INVENTION

This invention relates to shared subscriber-based network communications in which communications can be implemented through multiple cells or access points, and more specifically, to best frame derivation for the receivers within the network.

BACKGROUND

Wireless communication systems are widely deployed to provide various types of communication. A typical wireless data system, or network, provides multiple users access to one or more shared resources. A system may use a variety of multiple access techniques such as frequency division multiplexing (FDM), time division multiplexing (TDM), code division multiplexing (CDM), and others. Examples of wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Hereafter, a wireless communication device (WCD) includes, but is not limited to a "user equipment" (UE), mobile station, fixed or mobile subscriber unit, pager, or any other type of device capable of operating in a wireless environment. When referred to hereafter, a base station (BS) includes but is not limited to a "Node-B", an "e-NB", a site controller, an access point (AP) or any other type of interfacing device in a wireless environment.

An AP is a station or device which provides a wireless access for devices to establish a wireless connection with a LAN, and establishes a part of a wireless LAN (WLAN). If the AP is a fixed device on a WLAN, the AP is a station which transmits and receives data. The AP permits connection of a WCD to a network, provided that the WLAN itself has a connection to the network.

Typically only the best available frame is selected based on the quality metric associated with the arriving frames. In a network implemented with multiple fixed stations, such as base stations or access points, it is generally the case that an access terminal communicates with one fixed station. In the case of a clear communication link, this is generally adequate. In situations where the communication link is weak, the communication with a single station can result in reduced signal quality.

SUMMARY

Various aspects and embodiments of the invention are described in further detail below.

In one aspect, a communications node includes a receiving circuit that receives communication signals, and a data combining circuit. Each communication signal includes a block of data estimates with a quality metric. Each block of data estimates is derived from an original block of data sent over different wireless paths, or from a derived block. The data combining circuit combines the blocks of data estimates as a function of the respective received quality metrics to produce an output set of data estimates having an improved data reliability. In a particular configuration, the output set of data estimates has an improved reliability of data quality that exceeds the reliability of any of the received blocks of data estimates, and each of the received blocks of data estimates can correspond to reception by wireless receiving devices.

In particular configurations, the blocks of data may include voice data, a stream of bit estimates, a stream of symbol estimates, and/or a stream of soft decisions, said stream of soft decisions including the information of the respective quality metric. The quality metric may include a single entry representative of the overall reliability of its respective block of data estimates, or multiple entries that describe the reliability of different portions of the respective block of data estimates.

In another aspect, improved reliability of wireless transmission output data is provided by receiving communication signals, in which each communication signal includes a block of data estimates with respective quality metrics, wherein each block of data estimates is derived from an original block of data sent over different wireless paths, or from a derived block. The blocks of data estimates are combined as a function of the respective received quality metrics to produce an output set of data estimates having improved data reliability. In a particular configuration, the output set of data estimates has an improved reliability of data quality that exceeds the reliability of any of the received blocks of data estimates, and each of the received blocks of data estimates can correspond to reception by wireless receiving devices.

In particular configurations, the blocks of data may include voice data, a stream of bit estimates, a stream of symbol estimates, and/or a stream of soft decisions, said stream of soft decisions including the information of the respective quality metric. The quality metric may include a single entry representative of the overall reliability of its respective block of data estimates, or multiple entries that describe the reliability of different portions of the respective block of data estimates.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
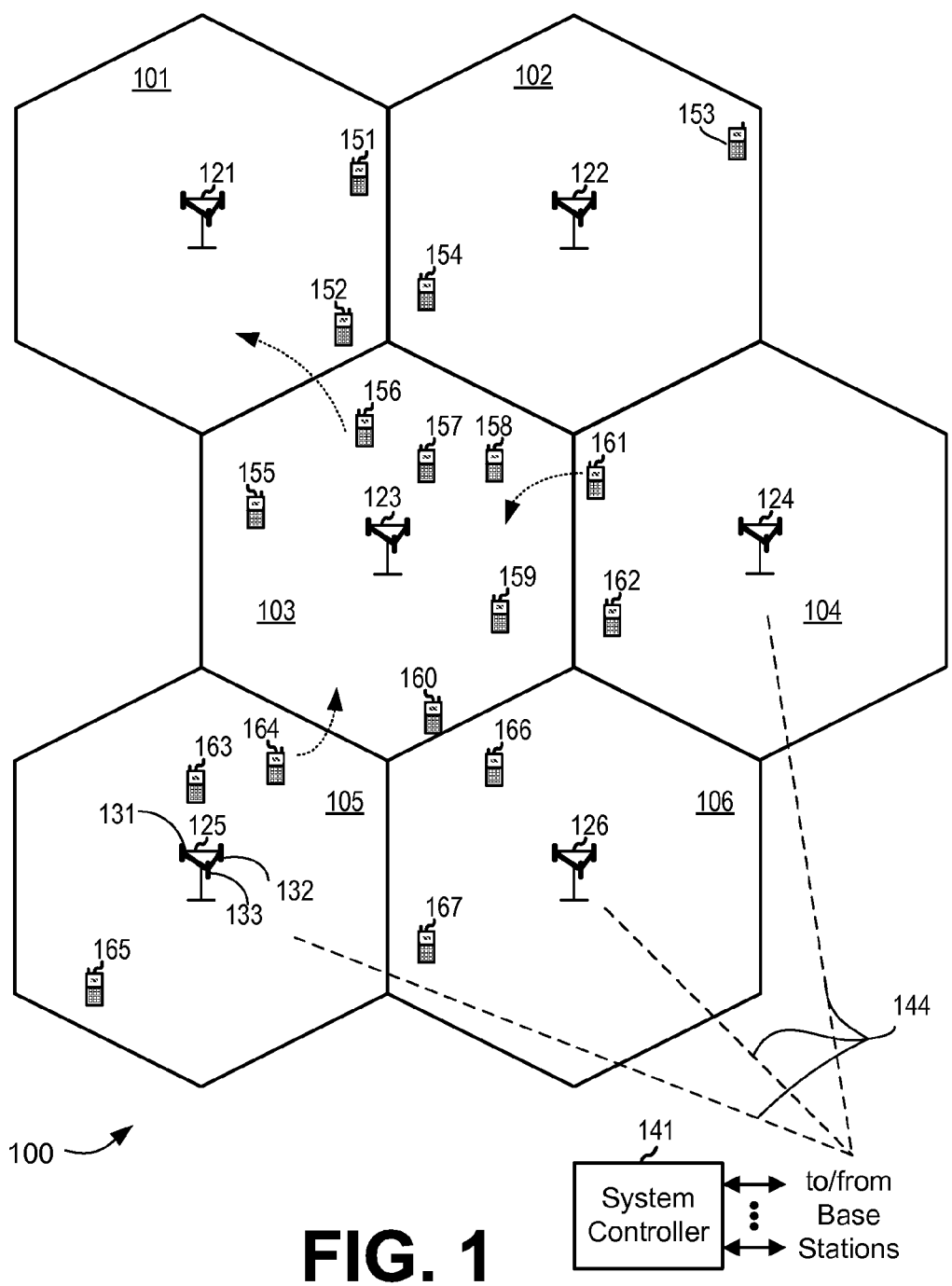
FIG. 1 is a diagram representing a network in which multiple cells are established by multiple base stations or access points.

The features and nature of the present invention will become more apparent from the detailed description set forth below when taken in conjunction with the drawings in which like reference characters identify correspondingly throughout and wherein:

Overview

Multiple copies of voice frames may be arriving through different paths in the infrastructure with an associated quality metric. For example, the voice frames can be arriving from an Access Terminal via different base stations. A better voice frame can be derived using weighted combining of the frames, as opposed to merely selecting the best available frame.

One issue with the use of multiple copies is that there may only be one best signal. A combination of signals can therefore result in deterioration, rather than an improvement, of an aggregate signal. In order to use the multiple copies, a selection may be made with the intent of providing a combined signal, which in turn may result in an improvement in the received data over that provided by a single best signal.

Weighted combining of voice packets can be implemented. This can allow combining of voice packets under the following conditions:

1. Multiple copies of voice frames P_i, 0<i<=N are available.
2. A weight W_i is available for each voice frame P_i as a confidence metric representing the quality of the frame, where 0<=W_i<=1.
3. Each bit position j with voice frame bit P_ij in voice frame P_i is represented in NRZ notation (−1, 1) for purposes of computation. (0 is represented as 1, and 1 is represented as −1).
4. A threshold T can be set for the weight W_i associated with voice frame P_i, such that only voice frames with weights greater than T (such as T=0.5 or T=0.6) are selected for the best frame derivation algorithm. Details are provided for below regarding best frame derivation algorithms. A choice of the value of the threshold T can be based on a knowledge of how the suggested confidence metrics (weights) are related to the probability of error in the channel paths taken by each voice frame, with a knowledge of how the weight metric is derived (this can be proprietary). It is assumed in general that a higher value of the weight represents a lower value of such a probability of error.
5. A new value for bit position j is derived based on the weighted summation (Chase combining) over the index i of the product terms (W_i*P_ij), for voice frames with W_i>=T. A new value for the bit position j is derived based on the sgn (signum) function over the sum of the product terms, i.e., P{bfd}_ij=sgn(sum_i{W_i*P_ij}) over vectors P_i with W_i>=T. (bfd—best frame derivation)
6. Error-rates in the voice frames can be small when associated weights are high. Errors can typically occur in different bit positions for different copies of the same original voice frame. In the presence of more than two versions of the voice frame, the best frame derivation algorithm attempts to recover the correct value in a particular bit position with the weighted combining.
7. In the presence of only two voice frames, the weighted summation is equivalent to merely selecting the best frame among the available frames (selecting the frame with the higher weight). In the presence of more than two voice frames in the wireless infrastructure arriving through independent paths, weighted combining helps in deriving the best version of the voice frame based on the available information in the voice frames.
8. When all weights are below the threshold T, then merely the best frame selection algorithm can be used (selecting the frame with the highest weight) over all available versions of the voice frame.
9. The technique can be used for best frame derivation for general data transmissions in wireless infrastructure networks.

In various embodiments, a best frame derivation algorithm can be used via Chase combining over voice frames using associated confidence metrics for voice frames, when the confidence metrics exceed a certain value of a threshold. When the confidence metrics associated with the voice frames fall below the threshold, then the traditional best frame selection algorithm can be used that just picks the best frame among the available frames. Alternatively, the best frame derivation algorithm can continue to be used if desired when the confidence metrics fall below the threshold for all voice frames.

In the example configuration, the combining of multiple communication paths is performed on the uplink, with the downlink received by the ATs without applying the same combining techniques.

It is possible to implement the combining techniques for signals received by the ATs or APs in the network. It may be possible in some networks for an AT to act as an AP. For exemplary purposes only, explanation of the combining techniques provided below are with respect to the uplink.

Best Frame Derivation with Weighted Transmission Vectors

In various practical embodiments, assume K independent transmissions of an N-bit vector, and assume wk is the weight associated with the $k^{th}$ transmitted version. ($0 \leq w_k \leq 1$). Then the soft bit $\rho_i$ associated with bit position i can be given by:

$$\rho_i = \frac{1}{K}\left(\sum_{k \varepsilon A_{i,+}} W_k - \sum_{k \varepsilon A_{i,-}} W_k\right) \quad \text{(Eq. 1)}$$

Where $A_{i,+}$ is the set of all vectors with a 1 in bit position I, and $A_{i,-}$ is the set of all vectors with a −1 in bit position i Continuing, let $w_{c,rms}$ be denoted as the effective weight of the combined vector. Also, define $w_{c,rms}$ as the average RMS distance over all bit positions given by $$w_{c,rms} = \sqrt{\frac{1}{N}\sum_{i=1,N}\rho_i^2} \quad \text{(Eq. 2)}$$

If $A_{i,+}$ is null or if $A_{i,-}$ is null for a particular bit position i (indicating that all K vectors contribute the same bit value (1 or 0) to that bit position i), then $$\rho_i^2 = \left(\frac{1}{K}\left(\sum_{k=1,K} W_k\right)\right)^2 \quad \text{(Eq. 3)}$$

As an example, for good quality wireless channels, when the probability of error for all the transmissions associated with the original source N-bit vector tends to 0, then $$w_{c,rms} = \sqrt{\frac{1}{N}N\rho_i^2} = \sqrt{\rho_i^2} = \frac{1}{K}\left(\sum_{k=1,K} W_k\right) \quad \text{(Eq. 4)}$$

For a communication node 311-313 to propagate a derived vector with a derived quality metric further in the network, $w_{c,rms}$ obtained as specified in equation (2) can be used as the effective derived quality metric W for the vector that is propagated or that is used for further processing by the communication node 311-313.

The derived vector to be propagated or to be used for further processing by a communication node 311-313 can be determined based upon the values of the hard bits for each bit position i. The hard bit for each bit position i can be determined choosing the value of the hard bit to be 1 if $\rho_i$ is positive or choosing the value of the hard bit for that bit position to be −1 if $\rho_i$ is negative. If $\rho_i$ is zero, the system can choose to have the corresponding hard bit to be either −1 or 1. The hard bit values for each bit position can constitute the derived vector.

Both the derived vector and the derived quality metric can be propagated by a communication node 311-313.

Alternatively just the set of soft bit values $\rho_i$ can be propagated, and optionally $w_{c,rms}$ can be propagated as well along with the soft bit values $\rho_i$. A communication node 311-313 may prefer to transmit hard bits instead of soft bits due to the additional cost of representation of the values associated with each soft bit.

For a derived vector when hard bits are propagated, combining can be done as suggested in Eq. 1.

When a communication node 311-313 receives (K+L) vectors where K vectors contain hard bits and L vectors contain soft bits, then the communication node 311-313 may combine the received information using the equation $$\rho_i = \frac{1}{K+L}\left(\sum_{l\in S}\rho_{l,i} + \sum_{k\in A_{i,+}}w_k - \sum_{k\in A_{i,-}}w_k\right) \quad (Eq. 5)$$

Here S is the set of L vectors received with soft-bits, and $\rho_{l,i}$ is the soft bit corresponding to the $i^{th}$ bit position in the $l^{th}$ vector from set S. This equation suggests the general method for hierarchical combining of data at a communication node 311-313. It is possible that among the (K+L) vectors, some of the vectors contain information about only certain bit positions. In that case, (Eq. 1) or (Eq. 5) can continue to be used such that for a bit position i, the soft bit $\rho_i$ is computed based on the available contributions to that bit position from the received vectors. Irrespective of whether (Eq. 1) or (Eq. 5) is used to compute the soft bit for bit position i, (Eq. 2) can be used to compute the effective derived quality metric over all the received bits for all received vectors. For the derived vector that is forwarded, either hard bits can be determined based on whether $\rho_i>0$ (hard bit is 1) or whether $\rho_i<0$ (hard bit is −1) or whether $\rho_i=0$ (hard bit can be either −1 or 1).

In general, while the discussion uses a (−1, 1) representation for the equations specified, a linear transformation can be used to obtain an alternate representation. If an alternate representation is used for bits (such as (0,1)) then a linear transformation can be used to convert that alternate representation to the (−1,1) representation; a transformation of y=½(x+1) to go from a (−1,1) representation to a (0,1) representation. The inverse transformation x=2y−1 can be used to go from a (0, 1) representation to a (−1,1) representation. Alternatively, the transformation y=½(1−x) can be used to go from a (−1,1) representation to a (1,0) representation; the corresponding inverse transformation x=1−2y can be used to go from a (1,0) representation to a (−1,1) representation. Subsequently the suggested equations above can be used at a communication node 311-313 to process the received information at the communication node 311-313.

Configuration

FIG. 1 is a diagram representing network 100 in which multiple cells 101-106 are established by multiple base stations or access points 121-126. Each base station 121-126 may also include multiple sectors, represented at 131-133 on station 125. The stations 121-126 can be connected to a radio network controller or system controller 141 through a backhaul, represented (for three of the base stations) by dashed lines 144. This backhaul connection can be either direct or indirect, in accordance with convenience of system design.

Within the cells, access terminals (ATs) 151-167 may be able to communicate through their respective base stations 121-126. While the diagram depicts fixed boundaries between cells 101-106, the actual air interface may be established in accordance with signal parameters which generally overlap. In addition, as ATs move, as indicated by the arrows adjacent ATs 156, 161 and 164, their respective communication links may be handed off to different cells.

Figure 2:
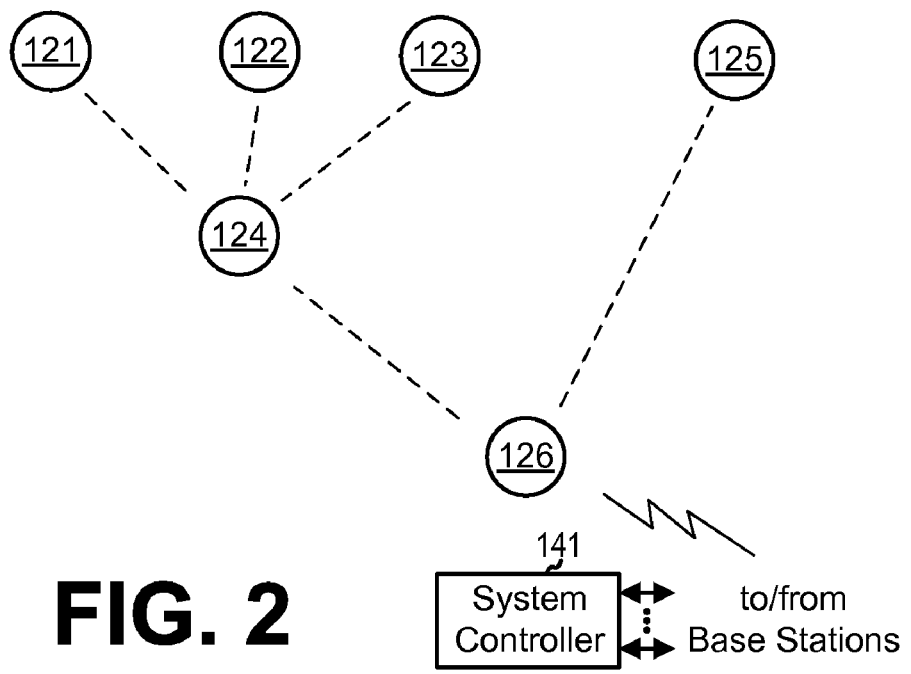
FIG. 2 is a diagram depicting a network environment in which the multiple cells or sectors of FIG. 1 communicate with a base station controller (BSC) or system controller.
Figure 3:
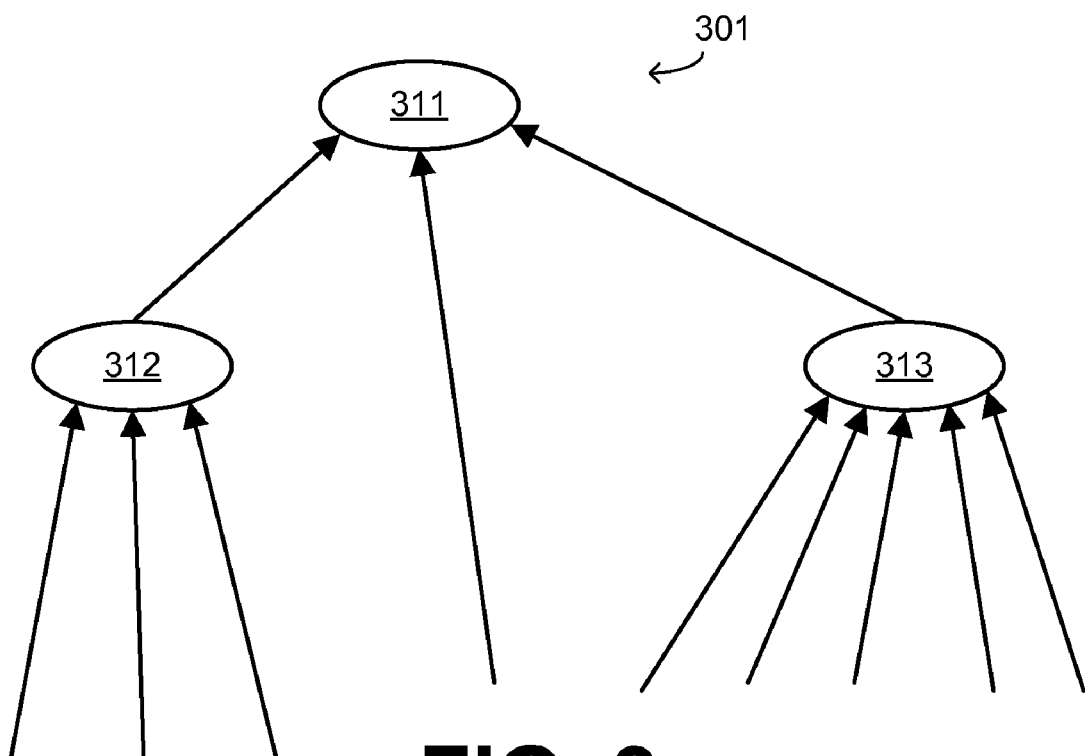
FIG. 3 is a diagram depicting a network environment showing the network environment as communication nodes.

FIGS. 2 and 3 are diagrams depicting a network environment in which multiple cells or sectors communicate with a base station controller (BSC) or system controller. FIG. 2 depicts communication links for the network environment. FIG. 3 depicts (symbolically) the network environment as communication nodes.

Referring to FIG. 2 a network environment in which the multiple cells or sectors of FIG. 1 communicate with a base station controller (BSC) or system controller is depicted. The base stations 121-126 are in communication with BSC 141. In the case of base stations 121-123, signals can be relayed through multiple communication stations (e.g., stations 124 and 126).

FIG. 3 is a diagram depicting a network environment 301 showing the network environment as communication nodes 311, 312, 313. Nodes 311, 312, 313 are connected such that communications received at node 311 may have been received directly at node 311 or may have been relayed through nodes 312 or 313.

Figure 4:
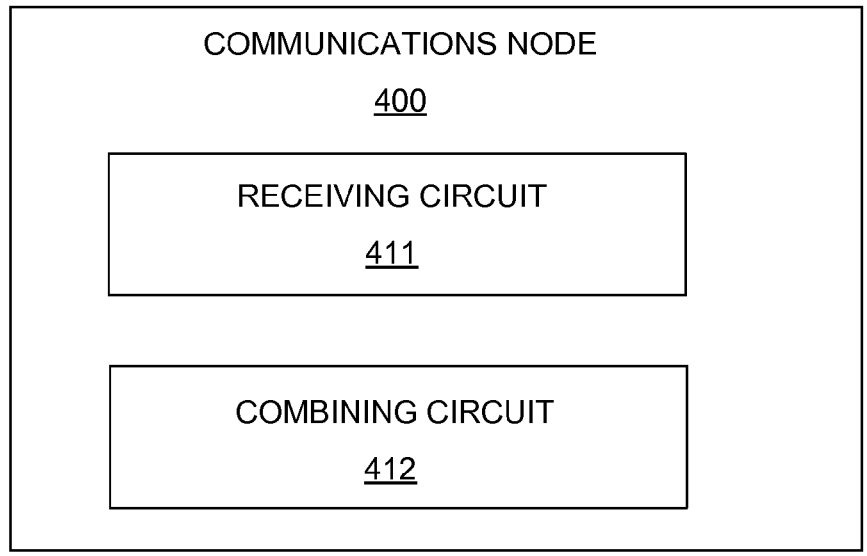
FIG. 4 is a block diagram showing the circuit configuration of an example communications node.

FIG. 4 is a block diagram showing the circuit configuration of an example communications node 400, such as a data communication circuit that may reside in an upper-level of a hierarchy of nodes, such as any of nodes 124 and 126 of FIG. 2. With the exemplary communications node 400 include a receiving circuit 411 and a data combining circuit 412.

In operation, the receiving circuit 411 can receive a plurality of communication signals, in which each communication signal includes a block of data estimates with one or more respective quality metrics. Each of such blocks of data estimates can be derived from a common original block of data sent over at least one different wireless path from the other data estimates. For example, a particular AT may transmit a single stream of voice information to base stations 121, 122 and 123 of FIG. 2 via a different/unique wireless path. In response, base stations 121, 122 and 123 can receive the voice signal and produce a set of data estimates, e.g., bits or symbols. In addition to the stream of estimates, each of the base stations 121, 122 and 123 may also produce some value that reflects the likely quality of the data estimates. For instance, the base stations 121, 122 and 123 may each produce a quality metric for each block of voice data received based on signal strength, may each produce multiple quality metrics for each block of voice data received based on signal strength, or may each produce a quality metric for bit/symbol of each block of voice data received based on soft-decision metrics.

Continuing, the data combining circuit 412 may combine the blocks of data estimates as a function of the respective quality metrics to produce an output set of data estimates having an improved data reliability. This improved reliability results in data quality that exceeds the reliability of any of the received blocks of data estimates.

The received data may correspond to wireless receiving devices which can be base stations, access terminals, or access points 121-126 (FIG. 1). The blocks of data estimates correspond to reception by the wireless receiving devices 121-126. The blocks of data may also correspond to reception by a wireless base station receiving wireless communications from a single user terminal. Each block of data estimates is provided in a particular form, such as a stream of bit estimates or a stream of symbol estimates.

As mentioned in passing above, it is possible to provide each block of data so as to include a stream of soft decisions. The stream of soft decisions would include the information of the respective quality metric. The data combining circuit 412 may be configured to linearly combine respective soft decisions from the communication signals.

In one example configuration, the data combining circuit 412 is configured to combine at least three separate blocks of data estimates based on their respective quality metrics. The data combining circuit 412 may additionally be configured to determine a quality metric of the output set of data estimates.

The quality metrics comprise single entry representatives of the overall reliability of its respective block of data estimates. Alternatively, the quality metrics may be provided as multiple entries that describe the reliability of different portions of the respective block of data estimates.

In various embodiments, it may be desirable to exclude any data with a quality metric so low as to be deemed undependable. In such instances, the combining circuit 412 may derive output data dependent on received data estimates having quality metrics above a predetermined threshold.

Chipset

The components 411 and 412 are capable of executing processing instructions, and can be provided as a chipset, or combined as one or more integrated circuits.

Functional Configuration

Figure 5:
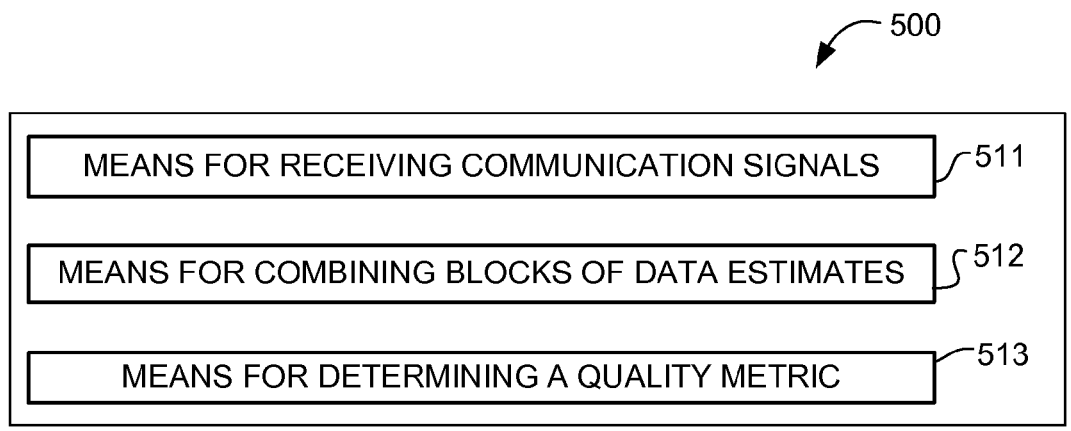
FIG. 5 is a diagram showing a functional configuration of apparatus for producing output data having improved reliability.

FIG. 5 is a diagram showing a functional configuration of apparatus 500 for producing output data having improved reliability. The apparatus 500 includes means 511 for receiving a plurality of communication signals, means 512 for combining the blocks of data estimates and means 513 for determining a quality metric of the output set of data estimates.

The means for receiving 511 the communication signals receive the signals as a function of the respective quality metrics to produce an output set of data estimates having improved data reliability. Each communication signal includes a block of data estimates with respective quality metrics, and each block of data estimates is derived from an original block of data sent over different wireless paths, or from a derived block. The means 512 for combining combines the blocks of data estimates as a function of the respective quality metrics to produce an output set of data estimates having improved data reliability. The blocks of data estimates provides the output set of data estimates which have an improved reliability of data quality that exceeds the reliability of any of the received blocks of data estimates as a result of the combining.

In particular configurations, the means 512 for combining have a capability of linearly combining respective soft decisions from the plurality of communication signals, and may combine at least three separate blocks of data estimates based on their respective quality metric.

Implementation

The techniques and modules described herein may be implemented by various means. For example, these techniques may be implemented in hardware, software, or a combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors, integrated circuits, or demodulators. The memory unit may be implemented within the processor or external to the processor, in which case it can be communicatively coupled to the processor via various means.

Operation and Implementation

Figure 6:
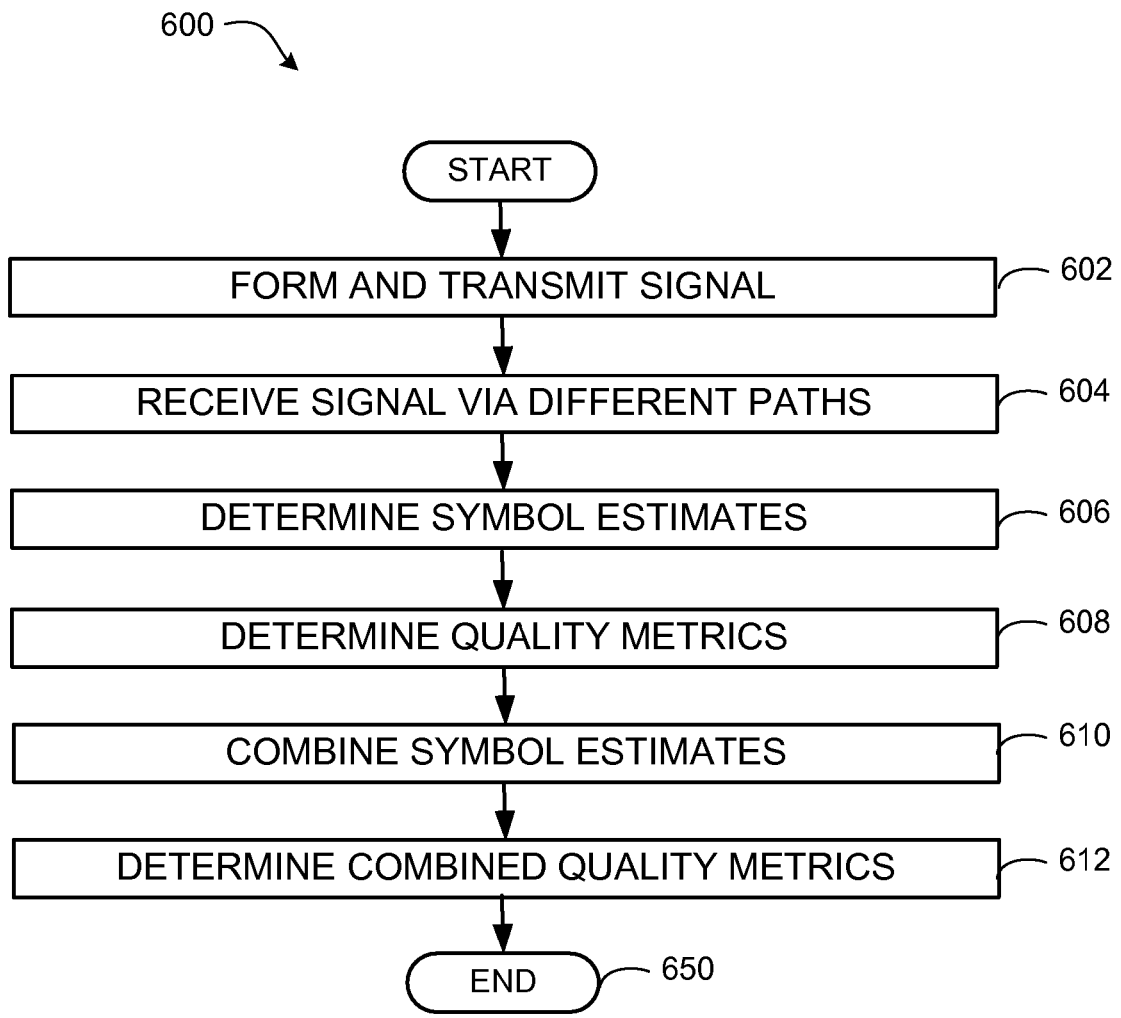
FIG. 6 is a flowchart outlining an exemplary operation according to the disclosed methods and systems.

FIG. 6 is a flow diagram showing the operation of a method 600 used to provide data estimates. The process starts in step 602 where a device, such as an AT, forms and transmits a common signal, e.g., a stream of voice data, to a plurality of receiving devices, e.g., base stations. Next, in step 604, the various base stations may each receive the signal of step 602 via a different wireless path, and in step 606 may each form a set of symbol (or bit) estimates for each respectively received signal.

In step 608, quality metrics for the received data estimates may be determined in any of a variety of forms, e.g., a single quality metric for a standard block of data, multiple quality metrics for a single block of data reflecting changes in received signal quality and even a quality metric for each bit/symbol.

Continuing, in step 610, the various symbol estimates may be combined using any of the techniques and equations provided above, and in step 612, a combined quality metric reflecting the overall likely quality of the estimates of step 610 may be determined. Control continues to step 650 where the process ends.

CONCLUSION

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

What is claimed is:

1. A communications node, comprising:
a receiving circuit that receives a plurality of communication signals, each of the plurality of communication signals including blocks of data estimates with one or more respective quality metrics, each of said blocks of data estimates derived from a common original block of data sent over at least one different wireless path from the other blocks of data estimates; and
a data combining circuit that combines the blocks of data estimates as a function of the one or more respective quality metrics to produce an output set of data estimates when each of the one or more respective quality metrics exceeds a predetermined threshold and selects a single block within the blocks of data estimates based on at least one respective quality metric associated with the single block when each of the one or more respective quality metrics of the blocks of data estimates falls below the predetermined threshold.

2. The communications node of claim 1, wherein the data combining circuit further produces one or more derived quality metrics for the output set of data estimates.

3. The communications node of claim 2, wherein the one or more derived quality metrics has a derived quality metric that is a function of the one or more respective quality metrics of the blocks of data estimates.

4. The communications node of claim 2, wherein the one or more derived quality metrics has a derived quality metric that is a function of the one or more respective quality metrics of the blocks of data estimates and of the data estimates in the blocks of data estimates.

5. The communications node of claim 1, wherein:
each of the blocks of data estimates correspond to reception by wireless receiving devices; and
each of the blocks of data estimates correspond to reception by a wireless base station receiving wireless communications from a single user terminal.

6. The communications node of claim 1, wherein the common original block of data includes voice data.

7. The communications node of claim 1, wherein each of the blocks of data estimates includes at least one of a stream of bit estimates and a stream of symbol estimates.

8. The communications node of claim 1, wherein each of the one or more respective quality metrics comprises a single entry representative of the overall reliability of its respective block of data estimates.

9. The communications node of claim 1, wherein:
each of the one or more respective quality metrics includes multiple entries that describe the reliability of different portions of a respective block of data estimates;
the common original block of data includes a stream of soft decisions, said stream of soft decisions including information of the respective quality metric; and
the data combining circuit linearly combines respective soft decisions from the plurality of communication signals.

10. The communications node of claim 1, further comprising:
the data combining circuit configured to combine at least three separate blocks of data estimates based on their respective quality metrics; and
the data combining circuit further configured to determine a quality metric of the output set of data estimates.

11. A method for producing output data having improved reliability, comprising:
receiving a plurality of communication signals, each communication signal including a blocks of data estimates with respective quality metrics, wherein each of the blocks of data estimates is derived from a common original block of data sent over at least one different wireless path; and
combining the blocks of data estimates as a function of the respective quality metrics to produce an output set of data estimates with a derived quality metric when each of the respective quality metrics exceeds a predetermined threshold, and selecting a single block within the blocks of data estimates based on at least one respective quality metric associated with the single block when each of the one or more respective quality metrics of the blocks of data estimates falls below the predetermined threshold.

12. The method of claim 11, wherein derived quality metric is a function of the respective quality metrics of the blocks of data estimates.

13. The method of claim 11, wherein the derived quality metric is a function of the respective quality metrics of the blocks of data estimates and of the data estimates in the blocks of data estimates.

14. The method of claim 11, wherein:
each of the blocks of data estimates corresponds to reception quality by a wireless receiving device; and
each of the blocks of data estimates correspond to a reception quality by wireless base station receiving wireless communications from a single user terminal.

15. The method of claim 11, wherein the common original block of data includes voice data.

16. The method of claim 11, wherein each of the blocks of data estimates includes at least one of a stream of bit estimates and a stream of symbol estimates.

17. The method of claim 11, wherein each of the respective quality metrics comprises a single entry representative of the overall reliability of its respective block of data estimates.

18. The method of claim 11, wherein:
each of the respective quality metrics includes multiple entries that describe the reliability of different portions of the respective block of data estimates; and
the common original block of data includes a stream of soft decisions, said stream of soft decisions including the information of the respective quality metric.

19. The method of claim 11, further comprising:
linearly combining respective soft decisions from the plurality of communication signals;
combining at least three separate blocks of data estimates based on their respective quality metric; and
determining a quality metric of the output set of data estimates.

20. Apparatus for producing output data having improved reliability, comprising:
means for receiving a plurality of communication signals, each of the plurality of communication signals including blocks of data estimates with one or more respective quality metrics, each of said blocks of data estimates derived from a common original block of data sent over at least one different wireless path from the other data estimates;
means for combining the blocks of data estimates as a function of the one or more respective quality metrics to produce an output set of data estimates with a derived quality metric when a respective value of each of the one or more respective quality metrics is desirable; and
means for selecting a single block within the blocks of data estimates based on at least one respective quality metric associated with the single block when the respective value each of the one or more respective quality metrics of the blocks of data estimates is undesirable.

21. The apparatus of claim 20, wherein the derived quality metric is a function of the one or more respective quality metrics of the blocks of data estimates.

22. The apparatus of claim 20, wherein the derived quality metric is a function of the one or more respective quality metrics of the blocks of data estimates and of the data estimates in the blocks of data estimates.

23. The apparatus of claim 20, wherein the common original block of data includes voice data.

24. The apparatus of claim 20, wherein each block of data estimates includes at least one of a stream of bit estimates and a stream of symbol estimates.

25. The apparatus of claim 20, wherein each of the one or more respective quality metrics comprises a single entry representative of the overall reliability of its respective block of data estimates.

26. A computer program product, comprising:
a computer-readable medium comprising:
a first instruction for causing a computer to receive a plurality of communication signals, each of the plurality of communication signals including blocks of data estimates with one or more respective quality metrics, each of said blocks of data estimates derived from a common original block of data sent over at least one different wireless path from the other data estimates;
a second instruction for causing the computer to combine the blocks of data estimates as a function of the one or more respective quality metrics to produce an output set of data estimates with a derived quality metric when a respective value of each of the one or more respective quality metrics is desirable; and
a third instruction for causing the computer to select a single block within the blocks of data estimates based on at least one respective quality metric associated with the single block when the respective value of each of the one or more respective quality metrics of the blocks of data estimates is undesirable.

27. An integrated circuit for producing output data having improved reliability, comprising:
a processor operable to receive a plurality of communication signals, each of the plurality of communication signals including blocks of data estimates with respective quality metrics, wherein each of the blocks of data estimates is derived from a common original block of data sent over at least one different wireless path, and operable to combine the blocks of data estimates as a function of the respective quality metrics to produce an output set of data estimates with a derived quality metric when each of the respective quality metrics exceeds a predetermined threshold, and to select a single block within the blocks of data estimates based on at least one respective quality metric associated with the single block when each of the one or more respective quality metrics of the blocks of data estimates falls below the predetermined threshold; and
a memory operable to store data coupled to said processor.

* * * * *